United States Patent

[11] 3,627,332

| [72] | Inventor | Josef Tronser<br>North Tonawanda, N.Y. |
|---|---|---|
| [21] | Appl. No. | 880,837 |
| [22] | Filed | Nov. 28, 1969 |
| [45] | Patented | Dec. 14, 1971 |
| [73] | Assignee | Buffalo Forge Company<br>Buffalo, N.Y. |

[54] SHAFT SEAL ASSEMBLY
15 Claims, 20 Drawing Figs.

| [52] | U.S. Cl. | 277/65 |
|---|---|---|
| [51] | Int. Cl. | F16j 15/32 |
| [50] | Field of Search | 277/65, 59,<br>76, 58, 71, 72, 79, 139 |

[56] References Cited
UNITED STATES PATENTS

| 3,081,096 | 3/1963 | Woodbury | 277/137 X |
|---|---|---|---|
| 3,172,671 | 3/1965 | Downs | 277/137 |

*Primary Examiner*—Robert J. Smith
*Attorney*—Sommer, Weber & Gastel

ABSTRACT: A shaft seal assembly for a shaft which extends through an enlarged opening in a housing wall which is radially movable with respect to the shaft including a seal housing mounted on the housing wall, a pair of spaced sealing discs bearing on opposite side portions of the seal housing under the bias of springs, said sealing discs having a relative radial sliding connection with respect to the seal housing, and a pair of spaced pins extending in the same direction as said shaft for supporting the spaced discs in fixed radial relationship relative to the shaft.

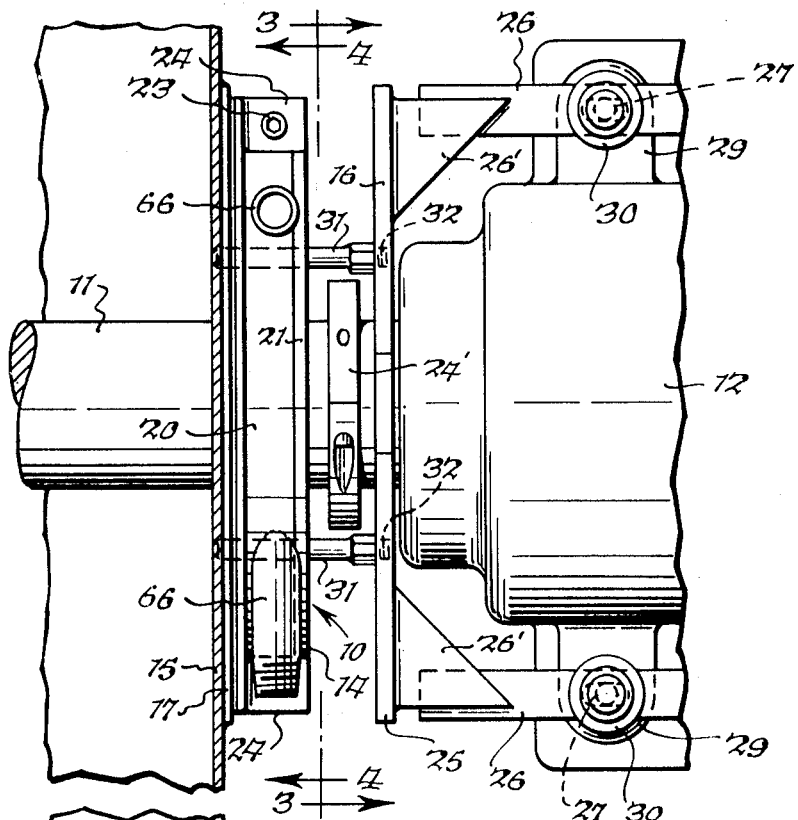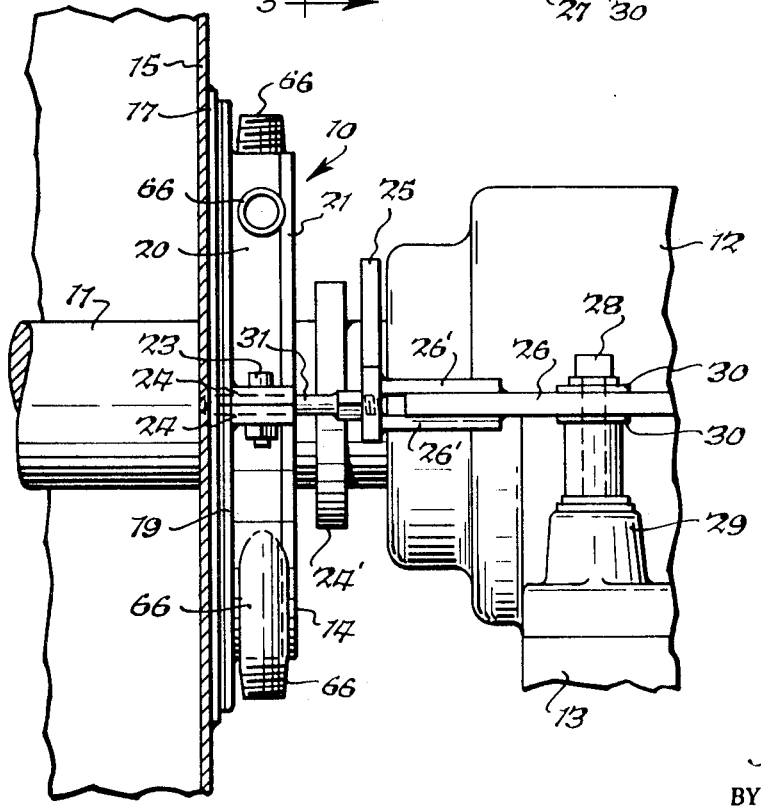

INVENTOR.
Josef Tronser
BY
Joseph P. Gastel
ATTORNEY.

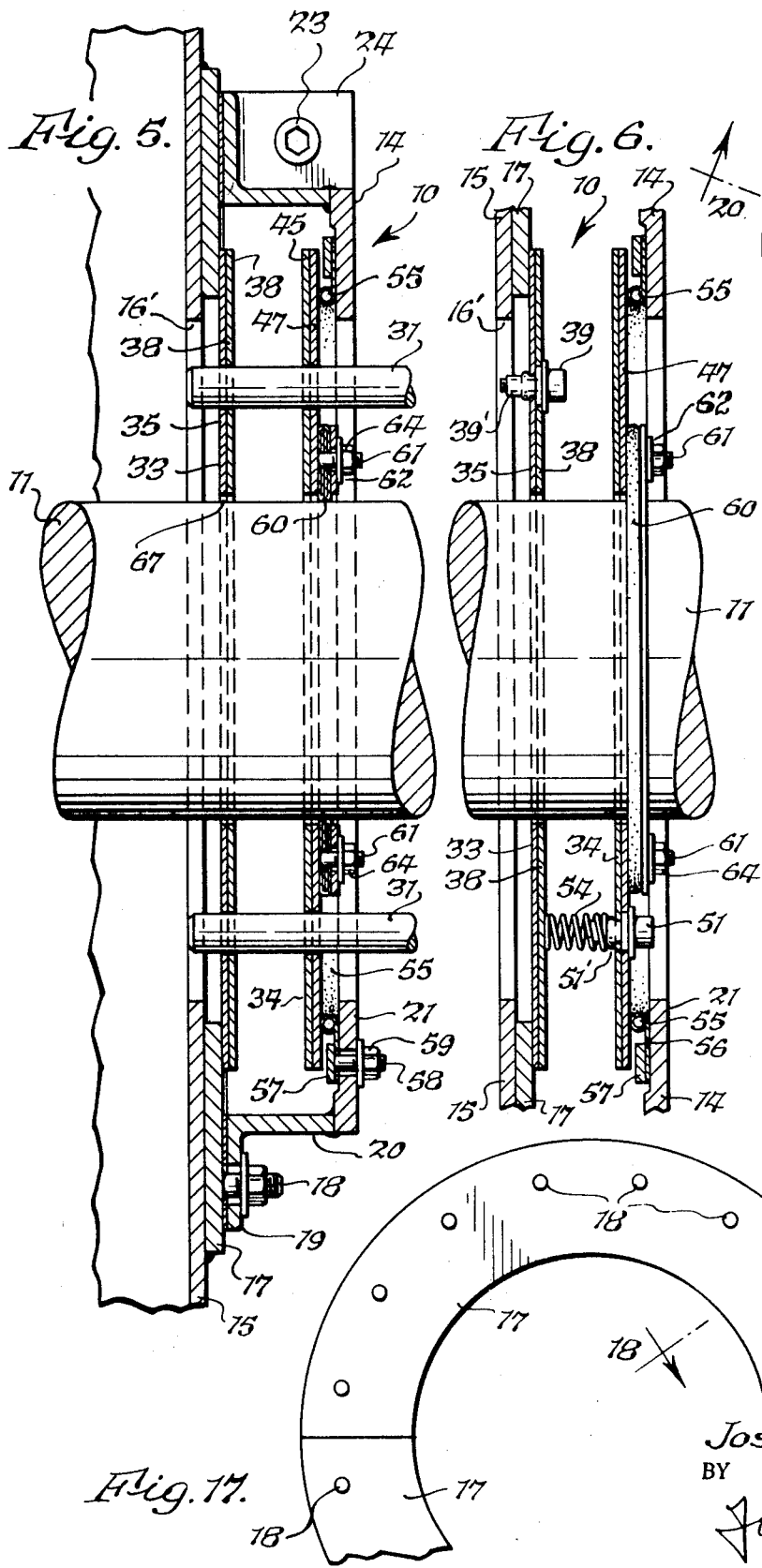
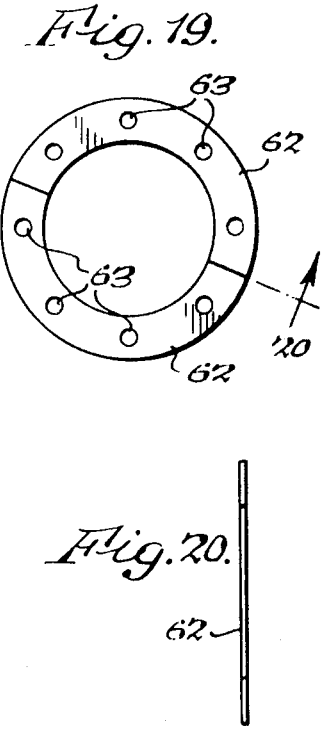
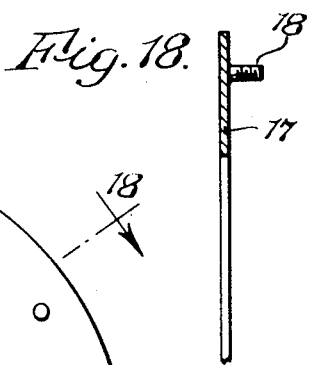

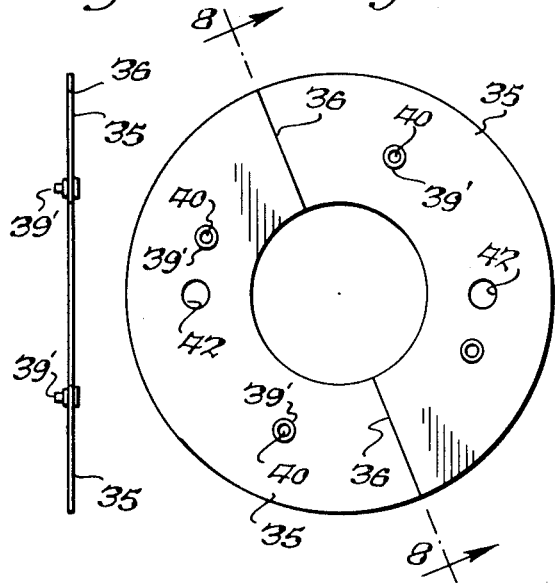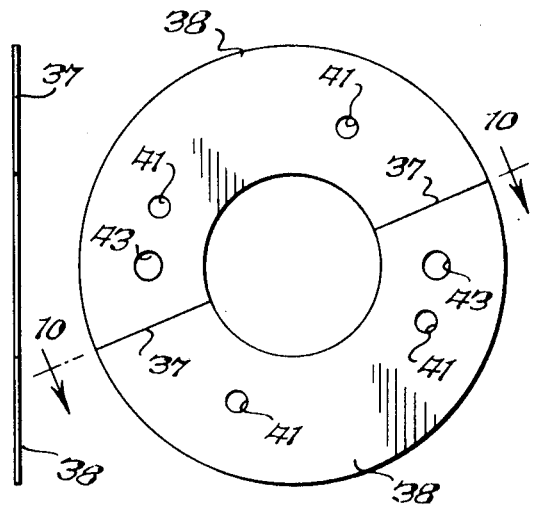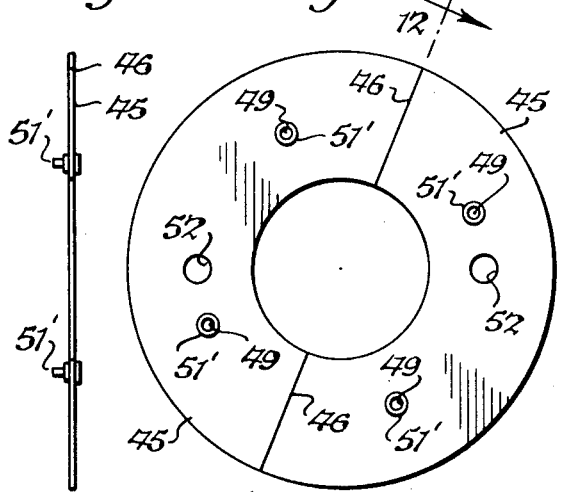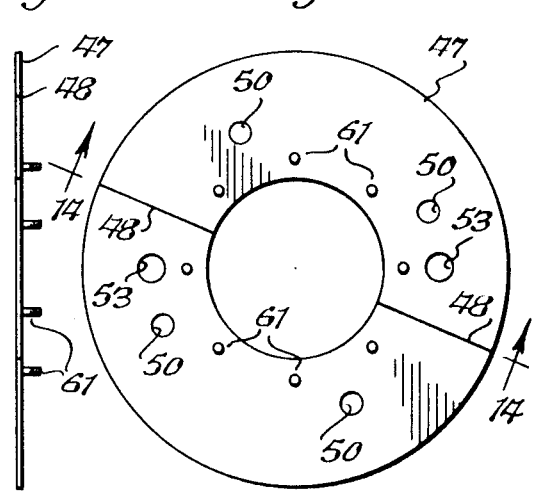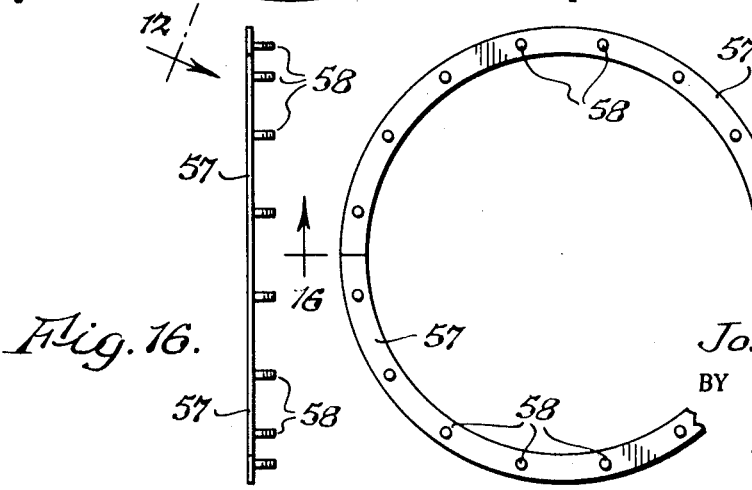

SHAFT SEAL ASSEMBLY

The present invention relates to an improved seal assembly which effects sealing between a fan shaft and a fan-housing wall which moves relative thereto with changes in temperatures of the gases in the fan housing.

By way of background, extremely large fans, of a diameter of between 12 and 30 feet which are mounted on shafts of up to 8 or 9 inches in diameter are used to pump industrial gases at volumes of up to 100,000 cubic feet per minute. These gases may reach a temperature of up to 600° F., which causes a relatively large expansion of the fan housing through which the fan shaft extends, so as to make effective sealing between the fan shaft and the housing relatively difficult.

Various types of seals were used in the past. However, these seals were subject to certain shortcomings. Certain seals which were pressurized with a clean compressed gas would permit leakage of hot dirty gases from the fan housing when the compressed gas supply failed. Other types of seals could give only good sealing at certain temperatures, but if the gas temperature changed, an accompanying change in dimensions of the fan housing occurred to produce leakage. Other sealing arrangements required frequent periodic replacement of the seal elements which wore out rapidly in use. It is with remedying the foregoing deficiencies of the prior art that the present invention is concerned.

It is accordingly one object of the present invention to provide a seal assembly for a fan shaft which is universally adjustable to compensate for movements of the fan housing due to changes in temperature to maintain a highly effective sealing relationship with the shaft which extends through an opening in the housing under all conditions. A related object of the present invention is to provide an improved seal assembly of the foregoing type in which the seal element exerts a relatively constant pressure on the shaft regardless of the movement of the fan housing relative thereto thereby providing long life to the seal element, as well as preventing leakage from the seal assembly with changes in temperature of the fan housing. Another related object of the present invention is to provide an improved seal assembly of the foregoing type which can be pressurized effectively because of the minimal amount of leakage from the seal housing. A further related object is to provide a shaft seal assembly of the foregoing type which will provide positive sealing under all temperature conditions even in the absence of the pressurized gas because of the effectiveness of the sealing elements. Other objects and attendant advantages of the present invention will readily be perceived hereafter.

The present invention relates to a shaft seal assembly for a shaft which extends through an enlarged opening in a housing wall which is primarily radially movable with respect to the shaft comprising a seal housing mounted on said housing wall, a base member fixedly mounted against movement toward and away from the shaft, seal means mounted on said base member in fixed radial relationship relative to the shaft and in radial sliding engagement with said seal housing, whereby the seal means maintain a good sealing relationship with the shaft notwithstanding relative radial movement of said wall with respect thereto. In a more specific aspect the seal means comprise a pair of spaced discs which are biased away from each other by springs with said discs being mounted on pins which extend from the base member and a compressed air-gas inlet to the seal housing for effecting a higher pressure therein that is experienced within the housing wall. The various aspects of the present invention will be more fully understood when the following portions of the specification are read in conjunction with the accompanying drawings wherein:

FIG. 1 is a fragmentary plan view showing the improved shaft-seal assembly mounted relative to a fan shaft carried by a bearing and extending into a fan housing;

FIG. 2 is a side elevational view of the subject matter of FIG. 1;

FIG. 5 is an enlarged fragmentary cross-sectional view taken substantially along line 5—5 of FIG. 4;

FIG. 6 is an enlarged fragmentary cross-sectional view taken substantially along line 6—6 of FIG. 4;

FIG. 7 is a view of a segmented seal disc which is located closest to the fan housing;

FIG. 8 is a view taken substantially along line 8—8 of FIG. 7;

FIG. 9 is a view of a segmented seal disc which is laminated onto the disc of FIG. 7;

FIG. 10 is a view taken substantially along line 10—10 of FIG. 9;

FIG. 11 is a view of one of the seal discs which is remote from the fan housing;

FIG. 12 is a view taken along line 12—12 of FIG. 11;

FIG. 13 is a view of a seal disc which is laminated onto the seal disc of FIG. 11;

FIG. 14 is a view taken along line 14—14 of FIG. 13;

FIG. 15 is a fragmentary view of a sealing member which is associated with the seal disc of FIG. 13;

FIG. 16 is a view taken substantially along line 16—16 of FIG. 15;

FIG. 17 is a fragmentary view of the member which mounts the seal housing onto the fan housing;

FIG. 18 is a fragmentary view partially in cross section taken substantially along line 18—18 of FIG. 17;

FIG. 19 is a view of the ring member which secures the shaft-sealing element to the disc of FIG. 13; and FIG. 20 is a cross-sectional view taken substantially along line 20—20 of FIG. 19.

Figure 3:
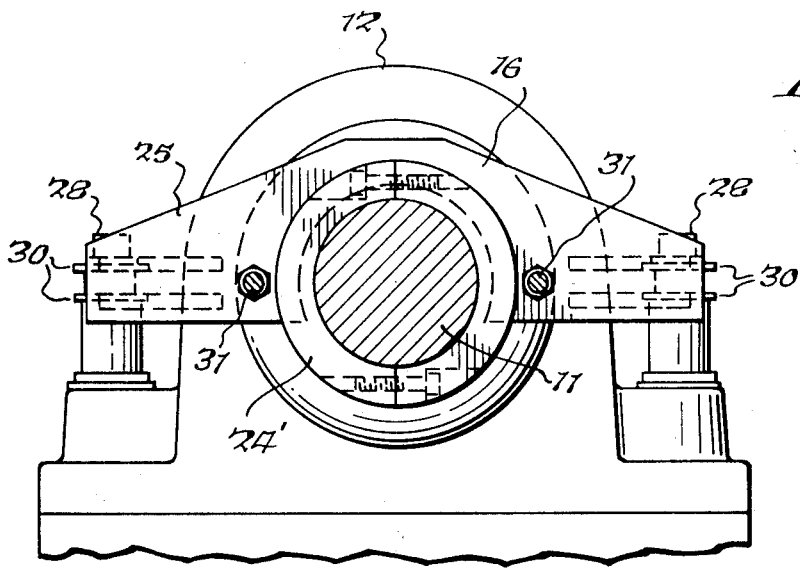
FIG. 3 is a fragmentary view partially in cross section taken substantially along line 3—3 of FIG. 1.

The improved seal assembly 10 for shaft 11 includes a seal housing 14 attached to fan-housing wall 15, and a yoke assembly 16 mounted on bearing 12 which is mounted on floor or base 13 and supports shaft 11 which extends through enlarged opening 16' in fan-housing wall 15. As noted briefly above, the housing wall 15 will expand with changes in temperature of the gas pumped by the fan. The amount of movement of wall 15 in a vertical direction is relatively significant considering that the gas will reach a temperature of 600° F. and further considering that the fan housing is of a size to accommodate a fan of between 12 and 30 feet in diameter mounted on shaft 11 which may be as high as 8 or 9 inches in diameter. A conventional deflector ring 24' is mounted on shaft 11, as shown.

Figure 4:
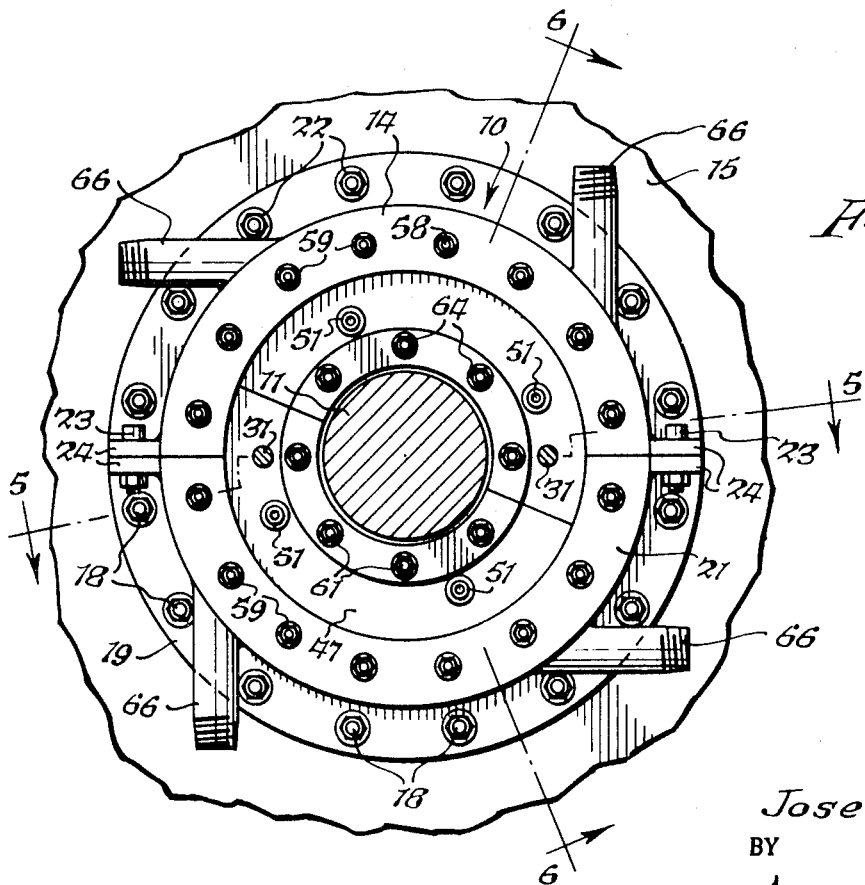
FIG. 4 is a fragmentary view partially in cross section taken substantially along line 4—4 of FIG. 1.

The seal-housing 14 includes annular ring plate 17 (FIG. 17) which is fabricated of 180° halves permanently welded onto wall 15. A plurality of studs 18 extend outwardly from plate 17 and through matching holes in annular flange 19 of housing 14, which also includes annular peripheral wall 20 and annular radial wall 21. As can best be seen from FIG. 4, annular housing 14 is fabricated from two 180° halves which, in addition to being secured to plate 17 by nuts 22 mounted on studs 18, are also attached to each other by bolts 23 which extend through adjacent ears 24. The use of the ring halves noted above permits the seal assembly to be mounted relative to shaft 12 and housing wall 15 when the latter are is assembled relationship. All of the other split rings disclosed hereafter also serve this purpose.

The seal assembly 10 also includes a yoke assembly 16 which includes a yoke or base 25 (FIG. 3) mounting spaced bars 26 by gussets 26'. Bars 26 have apertures 27 which receive screws 28 mounted on bearing pedestals 29. Because of the enlarged nature of apertures 27, the position of the yoke 25 may be adjusted back and forth or laterally. In addition, shims 30 are provided to adjust the elevation of the yoke 25.

A pair of parallel pins 31 have their ends threaded into tapped apertures 32 in yoke 25. Pins 31 extend into seal-housing 14, as best seen in FIG. 5. Mounted in spaced relationship on pins 31 are seal disc laminates 33 and 34 (FIGS. 5 and 6). Seal disc laminate 33 includes four 180° disc halves 35 and 38. Disc halves 35 (FIG. 7) have their ends butted against each other at 36 and these ends lie at 90° relative to butted ends 37 of disc halves 38. The relative orientation of disc halves 35 and 38 is shown in FIGS. 7 and 9. The disc halves 35 and 38 are attached to each other by screw members 39 which extend through aligned holes 40 and 41 in disc halves 35 and 38, respectively, and are received in nut members 39'. When disc halves 35 and 38 are assembled in the foregoing manner, apertures 42 will be in alignment with apertures 43 of disc halves 35 and 38, respectively. Apertures 42-43 receive pins 31 with a sufficiently loose fit to enable laminate 33 to slide on the tilt slightly relative to pins 31. Disc halves 35 and 38 are used to permit the assembling of laminate 33 while shaft 11 and housing wall 15 remain in assembled relationship.

A second seal disc laminate 34 is spacedly mounted within seal housing 14 relative to seal disc laminate 33. Laminate 34 is also fabricated from four 180° disc halves. In this respect, disc halves 45 are placed with their ends abutting at 46 (FIG. 11) and disc halves 47 are placed with their ends abutting at 48 (FIG. 13). Disc halves 45 and 47 are oriented relative to each other as shown in FIGS. 11 and 13. Disc halves 45 and 47 include apertures 49 and 50, respectively, which receive screw members 51 (FIG. 6) which hold these disc halves in assembled relationship, said screw members 51 being received in nuts 51'. Disc halves 45 and 47 also include apertures 52 and 53, respectively, which are in alignment when the disc halves are assembled in superimposed relationship. Apertures 52-53 receive pins 31 with a sufficiently loose fit to permit the disc laminate 34 to slide axially relative to pins 41 as well as tilt a slight amount if this becomes necessary. Disc halves 45 and 47 permit laminate 34 to be assembled while wall 15 and shaft 12 are in assembled relationship.

A plurality of springs 54 are mounted in compression between disc laminates 33 and 34 at spaced-apart locations, with one spring being associated with each of the four screws 51 and being mounted thereon. This will bias the plate laminates 33 and 34 away from each other so that laminate 33 will bear against plate 17 to provide a seal therewith while an annular tadpole gasket 55 provides sealing between laminate 34 and seal-housing end wall 21. Tadpole gasket 55 includes an annular tail member 56 which is sandwiched between end wall 21 and split ring 57 (FIGS. 5, 6 and 15) having studs 58 thereon which extend through aligned apertures in end wall 21, with said studs mounting nuts 59 thereon. Tadpole seal 55 effects good sealing between disc laminate 34 and end wall 21 while permitting relative radial sliding movement therebetween.

A seal gasket 60 is mounted in annular relationship relative to shaft 11 by receiving studs 61 which extend outwardly from disc halves 47. The gasket 60 is held against the faces of disc halves 47 by a split ring 62 (FIG. 19) having apertures 63 which receive studs 61, the split ring 62 being secured to studs 61 by nuts 64.

As noted above, fan shaft 11 remains relative stationary. It is the housing wall 15 which moves relative thereto with changes in temperature of the gases which may reach a temperature of 600° F. The wall expands primarily in a vertical direction but is may also tilt somewhat horizontally due to expansion. Since pins 31 are fixedly mounted against radial movement relative to shaft 11, the disc laminates 33 and 34 will maintain their same relative radial relationship with respect to shaft 11 regardless of movement of housing 15 in any direction. Therefore, seal 60 will always press against shaft 11 with the same force regardless of the amount of movement of wall 15. This will insure proper sealing regardless of the position of the housing wall 15 at any particular time. Furthermore, since the apertures 42, 43, 52 and 53 in the disc laminates are slightly oversize with respect to pins 31, any tilting of the wall 15 and the seal housing 14 in accompaniment therewith can be followed by the disc laminates 33 and 34 to maintain a good sealing relationship. Also, as noted above, as the housing 15 changes dimension, there will be relative sliding radial movement between seal laminate 33 and plate 17 and between seal laminate 34 and end wall 21.

The seal housing 14 is pressurized. To this end a plurality of inlet conduits 66 are coupled to a source of compressed gas, such as air, which is pumped into the interior of seal housing 14. This gas is preferably at a pressure which is one inch of water in excess of the pressure which is generated by the fan within the housing wall. Therefore, there will be a bleeding of air into the fan housing through annular space 67 surrounding shaft 11. This will prevent the hot dirty air within the fan housing from creeping into the atmosphere. It will be appreciated that there is leakage of compressed air only through the small annular space 67 as gaskets 60 and 55 seal off the remainder of the housing from the atmosphere. Because of this slight leakage only a very small amount of compressed air will be used. It will be further noted that since laminate 33 is fixed radially relative to shaft 11 by pins 31, a relatively small clearance can be provided at space 67 because there will be no chance of disc laminate 33 moving into contact with shaft 11. Furthermore, in the event the supply of compressed air should fail, there will be no leakage from seal housing 14 because of the presence of seal gaskets 55 and 60.

I claim:

1. A shaft seal assembly for a shaft which extends through an enlarged opening in a housing wall which is radially movable with respect to said shaft comprising plate means on said housing wall, a base member mounted on a fixed surface remote from said housing and said shaft, seal means, and mounting means for mounting said seal means on said base member in fixed surrounding relationship relative to said shaft and in sliding relationship relative to said plate means, whereby the seal means maintain a good sealing relationship with the shaft notwithstanding relative radial movement of said wall and said plate means with respect thereto.

2. A shaft seal assembly as set forth in claim 1 wherein said seal means comprises an annular disc member encircling said shaft and a seal member mounted on said annular disc member and engaging said shaft.

3. A shaft seal assembly as set forth in claim 2 including a second seal member between said annular disc member and said plate means.

4. A shaft seal assembly as set forth in claim 1 including a seal housing mounted on said housing wall and wherein said plate means is a part of said seal housing, said seal housing including a peripheral wall encircling said shaft and spaced radially therefrom and said plate means comprising an end wall attached to said peripheral wall in spaced relationship to said housing wall, said end wall having a first face which extends transversely to said shaft, and wherein said seal means comprises an annular disc member having a second face for slicing relative to said first face, and wherein said mounting means includes means for holding said second face in sealing relationship relative to said first face.

5. A shaft seal assembly as set forth in claim 4 including a second annular disc member in said seal housing and mounted in spaced relationship to said annular disc member and encircling said shaft and having a third face, means effectively secured to said base member for mounting said second annular disc member in fixed radial relationship relative to said shaft, a fourth face on said seal housing, and means for causing said third face to effectively engage said fourth face with a sliding fit to effect sealing therebetween.

6. A shaft seal assembly as set forth in claim 5 including a seal member mounted on said annular disc member and engaging said shaft.

7. A shaft seal assembly as set forth in claim 6 including a clearance between said second annular disc member and said shaft, and gas inlet means for admitting compressed gas into said seal housing between said discs, said seal member preventing leakage of said gas from said seal housing while said clearance permits leakage of said gas through said housing wall.

8. A shaft assembly as set forth in claim 1 wherein said seal means includes an annular disc member, and wherein said mounting means includes biasing means for biasing said annular disc member into continuous engagement with said plate means.

9. A shaft seal assembly as set forth in claim 8 wherein said mounting means comprises pin means mounted on said base means in spaced relationship to said shaft and extending in the direction of said shaft, a seal housing mounted on said housing wall and wherein said plate means is a part of said seal housing, said seal housing including a peripheral wall encircling said shaft and spaced radially therefrom and said plate means comprising an end wall attached to said peripheral wall and having a first face which extends transversely to said shaft, said annular disc member being mounted on said pin means for axial floating movement relative to said shaft, an inner surface on said annular member which is relatively close to said shaft, a second face on said annular member, said biasing means biasing said annular disc member for causing said second face to be biased toward said first face to effect a sealing relationship relative thereto while permitting said first face to move radially relative to said shaft.

10. A shaft seal assembly as set forth in claim 9 including a second annular disc member spaced from said annular disc member, and wherein said biasing means comprise a plurality of spring means interposed between said annular disc members, and wherein said second annular disc member includes a third face for effective bearing relationship with said housing wall.

11. A shaft seal assembly as set forth in claim 10 wherein said pin means comprise a pair of spaced pins and wherein said annular members include aperture means for receiving said spaced pins.

12. A shaft seal assembly as set forth in claim 11 wherein said seal housing includes a mounting plate having a fourth face against which said third face bears.

13. A shaft seal assembly as set forth in claim 12 wherein said base member includes a yoke member for mounting said pair of pins.

14. A shaft seal assembly as set forth in claim 11 including gas inlet means in said seal housing for admitting compressed gas thereto between said annular members.

15. A shaft seal assembly for a shaft which extends through an enlarged opening in a housing wall which is radially movable with respect to said shaft comprising plate means on said housing wall surrounding said opening, a base member mounted on a fixed surface remote from said housing and from said shaft, a disc member mounted on said base member and in fixed surrounding relationship relative to said shaft and in sliding relationship relative to said plate means, whereby said disc member provides a sealing relationship with said plate means notwithstanding relative sliding movement of said wall and said plate means with respect to said disc member.

* * * * *